(12) United States Patent
Beltz et al.

(10) Patent No.: US 7,559,541 B2
(45) Date of Patent: Jul. 14, 2009

(54) SPLASH BAR APPARATUS AND METHOD

(75) Inventors: Robert E. Beltz, Oak Grove, MO (US); Ohler L. Kinney, Jr., Overland Park, KS (US); Kathryn L. Pullen, Lenexa, KS (US); Jason Stratman, Lee's Summit, MO (US); Glenn S. Brenneke, Lee's Summit, MO (US); Larry F. Burdick, Olathe, KS (US); Eldon F. Mockry, Lenexa, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 483 days.

(21) Appl. No.: 11/527,442

(22) Filed: Sep. 27, 2006

(65) Prior Publication Data

US 2008/0073801 A1 Mar. 27, 2008

(51) Int. Cl.
*B01F 3/04* (2006.01)
(52) U.S. Cl. .................. 261/111; 261/113; 261/DIG. 11
(58) Field of Classification Search ................. 261/108, 261/111, 113, DIG. 11; 52/633, 654.1; 428/131, 428/134
See application file for complete search history.

(56) References Cited

U.S. PATENT DOCUMENTS

| | | | |
|---|---|---|---|
| 3,468,521 A * | 9/1969 | Furlong et al. .............. 261/111 |
| 3,489,124 A | 1/1970 | Cannon | |
| 3,647,191 A * | 3/1972 | Fordyce ...................... 261/111 |
| 4,133,851 A * | 1/1979 | Ovard ......................... 261/111 |
| 4,181,691 A * | 1/1980 | Cates et al. .................. 261/111 |
| 4,576,764 A * | 3/1986 | Shepherd et al. ............ 261/111 |
| 4,578,227 A * | 3/1986 | Ovard ......................... 261/111 |
| 5,104,588 A | 4/1992 | Kinney, Jr. | |
| 5,454,987 A * | 10/1995 | Cornwell, Jr. ............... 261/111 |
| 6,708,960 B2 * | 3/2004 | Olson et al. ................. 261/111 |

OTHER PUBLICATIONS

International Search Report dated Feb. 27, 2008.

* cited by examiner

*Primary Examiner*—Scott Bushey
(74) *Attorney, Agent, or Firm*—Baker & Hostetler LLP

(57) ABSTRACT

A heat exchange splash bar for evaporative cooling. The splash bar includes a first serrated base along with a second serrated base. The splash bar additionally includes a first side wall connected to the first serrated base that extends at an angle away from the first serrated base, that includes a plurality of apertures disposed thereon. A second side wall is connected to the second serrated base that also extends at an angle away from the second serrated base. The second side wall additionally includes a plurality of apertures disposed thereon. The heat exchange splash bar additionally includes a top wall that extends between the first side wall and the second side wall, wherein said top wall includes a plurality of openings having fingers extending therein.

20 Claims, 2 Drawing Sheets

SPLASH BAR APPARATUS AND METHOD

FIELD OF THE INVENTION

This invention relates generally to an improved heat exchange splash bar apparatus and method for use in fill assemblies of evaporative water cooling towers or the like. More particularly, the present invention relates, for example, to an apparatus and method whereby a splash bar having a generally trapezoid cross-sectional shape, is provided that offers improved heat exchange performance.

BACKGROUND OF THE INVENTION

Generally, evaporative water cooling towers include an upper hot water distribution system, for example, a system comprising a series or water distribution nozzles or an apertured distribution basin or the like, and an opposing cold water collection basin positioned at the base or bottom of the cooling tower. Commonly, a splash-type water dispersing fill structure is disposed in the space between the hot water distribution system and the underlying cold water collection basin. The aforementioned fill structure oftentimes includes either a plurality of elongated, horizontally arranged and staggered splash bars supported at spaced intervals by an upright grid structure or frame assembly, or a series of fill packs composed of a number of film fill sheets. During operation of the evaporative cooling towers as previously described, typically, hot water is distributed or disposed onto the fill structure, e.g., the bars or packs, wherein the water disperses onto the bars or packs, forming droplets. This forming of droplets helps to facilitate the heat exchange process. At the same time, cooling air currents are drawn through the fill structure, either by means of a motor driven fan or through use of a natural draft-inducing hyperbolic tower.

The fill structure of a given tower functions to promote interactive thermal interchange between the water and air. As water droplets are discharged from the distribution system as previously described, the temperature difference between the relatively warm water and the cooling air causes evaporation on the surface of the droplets. Therefore, the cooling of the water typically occurs at a rapid rate. However, as the surface temperature of individual droplets approaches the wet bulb temperature of the surrounding air, the cooling process is diminished and is dependent upon the rate of heat transfer from the inside of the droplet to the outside of the surface thereof. As such, it is desirable to interrupt the fall of individual droplets by splashing the drops on a fill bar or the like. This interruption can cause additional, new water surfaces to be exposed and, in some cases, subdivide the droplets into smaller droplets, increasing the total water surface area available exposed to the passing air.

Splash bars utilized in evaporative cooling towers must meet several criteria in order for the evaporative cooling towers in which they are employed, to operate and perform correctly. First, it is desirable for the splash bar to provide consistent, predictable dispersal and breakup of the water droplets over a range of water loadings typically encountered during operation of the evaporative cooling tower. Second, it is desired that the descending droplets be uniformly broken into relatively fine particles in a widely divergent pattern to facilitate enhancement of the heat exchange process. Third, it is desired that the splash bar design cause minimum air pressure drop in order to keep fan horsepower requirements and operating costs at relatively low levels. Fourth, the splash bar design should have sufficient structural strength to span large distances between adjacent upright grid supports, since deflection of the bars can enable the water to channel toward the low part of the bar, thereby causing coalescence of water and unequal water dispersal throughout the passing air streams. And finally, cost is an important consideration in the selection and fabrication of splash bars as large evaporative cooling towers employ a very large volume of splash bars for heat exchange purposes. Thus, it is desirable to manufacture splash bars from materials that are both structurally sound and economically reasonable.

Accordingly, there is a need in the art to provide an improved splash bar apparatus that provides increased heat exchange performance. Furthermore, there is a need in the art to provide a an inexpensive splash bar that has sufficient structural strength to resist deflection, while providing increased heat exchange performance.

SUMMARY OF THE INVENTION

The foregoing needs are met, to a great extent, by the present invention, wherein aspects of a splash bar apparatus and method are provided.

In accordance with one embodiment of the present invention, a heat exchange bar for evaporative cooling, comprising: a first serrated base, wherein said first serrated base lies in a plane; a second serrated base, wherein said second serrated base lies in the plane; a first side wall connected to said first serrated base that extends at an angle away from said first serrated base, wherein said first side wall includes a plurality of apertures disposed thereon; a second side wall connected to said second serrated base that extends at an angle away from said second serrated base, wherein said second side wall includes a plurality of apertures disposed thereon; and a top wall that extends between said first side wall and said second side wall generally parallel to the plane, wherein said top wall includes a plurality of openings, wherein said plurality of openings each comprise a first finger that extends therein.

In accordance with another embodiment of the present invention, a heat exchange bar for evaporative cooling that extends generally normal to a longitudinal axis, comprising: a first side wall that extends at an angle to the longitudinal axis, wherein said first side wall includes a plurality of apertures disposed thereon; a second side wall that extends at an angle to the longitudinal axis, wherein said second side wall includes a plurality of apertures disposed thereon; and a top wall that extends between said first side wall and said second side wall generally parallel to the plane, wherein said top wall includes a plurality of openings, said plurality of openings each comprising: first and second opposing side walls; and a first finger that extends from said first side wall.

In accordance with yet another embodiment of the present invention a heat exchange splash bar, comprising: means for passing a liquid to be cooled over the heat exchange splash bar, wherein the heat exchange splash bar comprises: a first serrated base, wherein said first serrated base lies in a plane; a second serrated base, wherein said second serrated base lies in the plane; a first side wall connected to said first serrated base that extends at an angle away from said first serrated base, wherein said first side wall includes a plurality of apertures disposed thereon; a second side wall connected to said second serrated base that extends at an angle away from said second serrated base, wherein said second side wall includes a plurality of apertures disposed thereon; and a top wall that extends between said first side wall and said second side wall generally parallel to the plane, wherein said top wall includes a plurality of openings, wherein said plurality of openings each comprise a first finger extending therein; means contacting the liquid to be cooled to the splash bar, wherein said means for contacting breaks the liquid to be cooled into liquid droplets; means for drawing an air current over and through the heat exchange splash bar; and means for withdrawing the heat from the liquid to be cooled.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
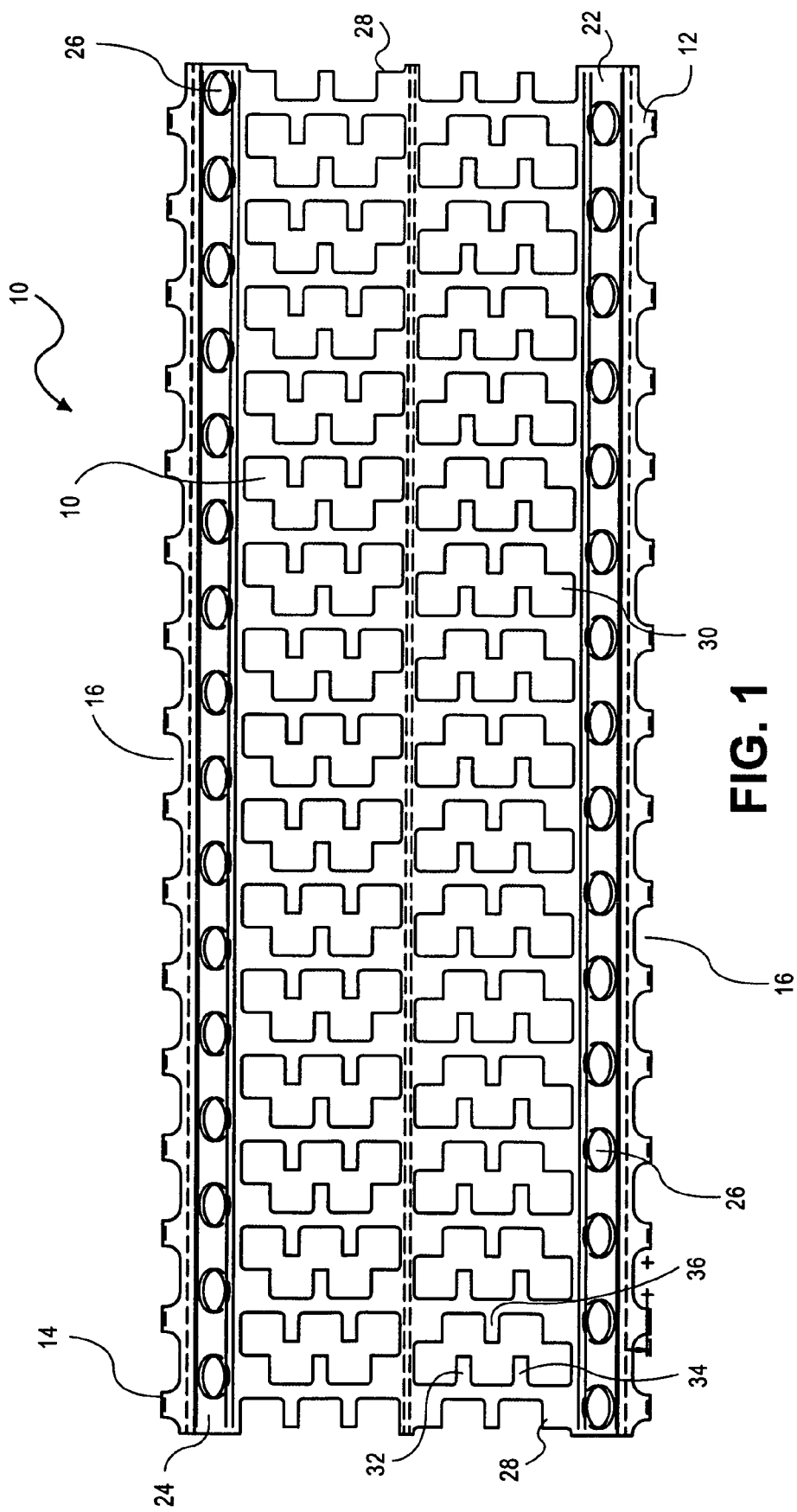
FIG. 1 is a plan view of a heat exchange splash bar in accordance with an embodiment of the present invention.

Various preferred embodiments of the present invention provide for an improved splash bar apparatus and method for use for evaporative heat exchange processes and methods. In some arrangements, the heat exchange splash bar apparatus is utilized in evaporative cooling towers or the like. It should be understood, however, that the present invention is not limited in its application to evaporative cooling towers, but, for example, can be used with other systems and/or other processes that require heat exchange. Preferred embodiments of the invention will now be further described with reference to the drawing figures, in which like reference numerals refer to like parts throughout.

Figure 2:
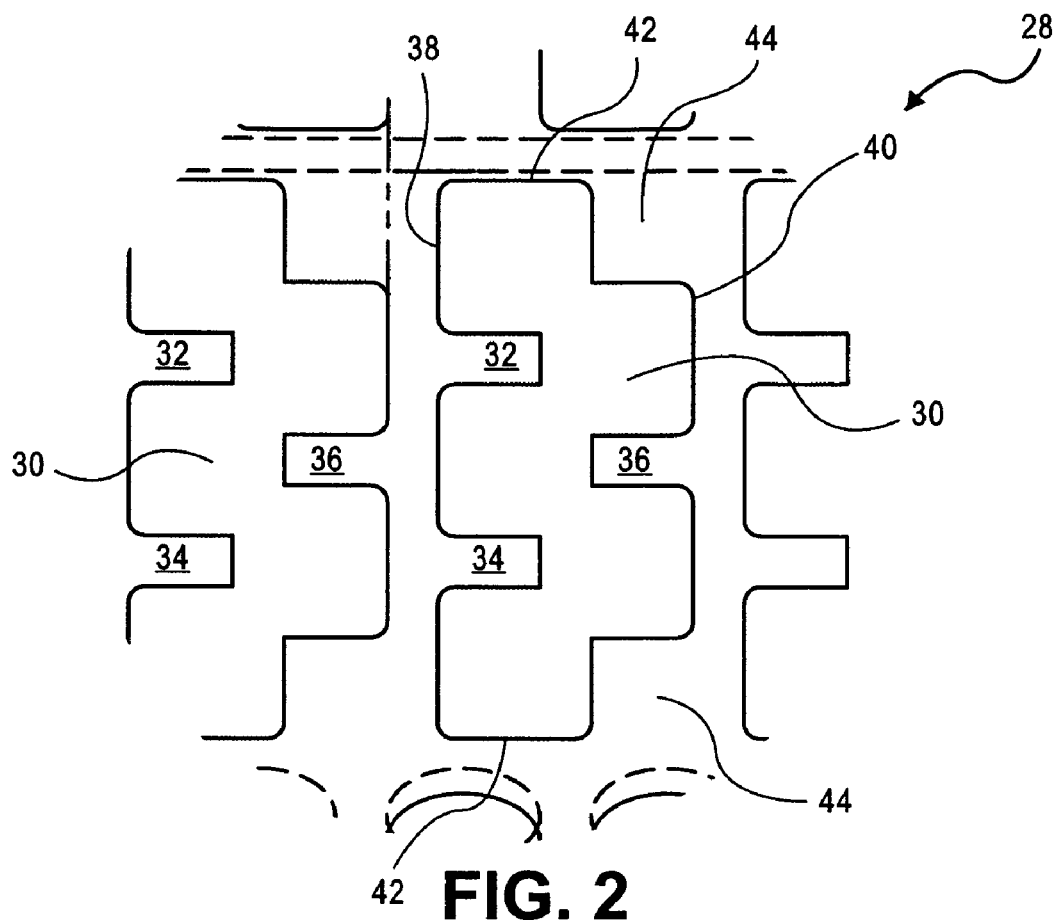
FIG. 2 is a sectional, plan view of the heat exchange splash bar embodiment depicted in FIG. 1, in accordance with an embodiment of the present invention.
Figure 3:
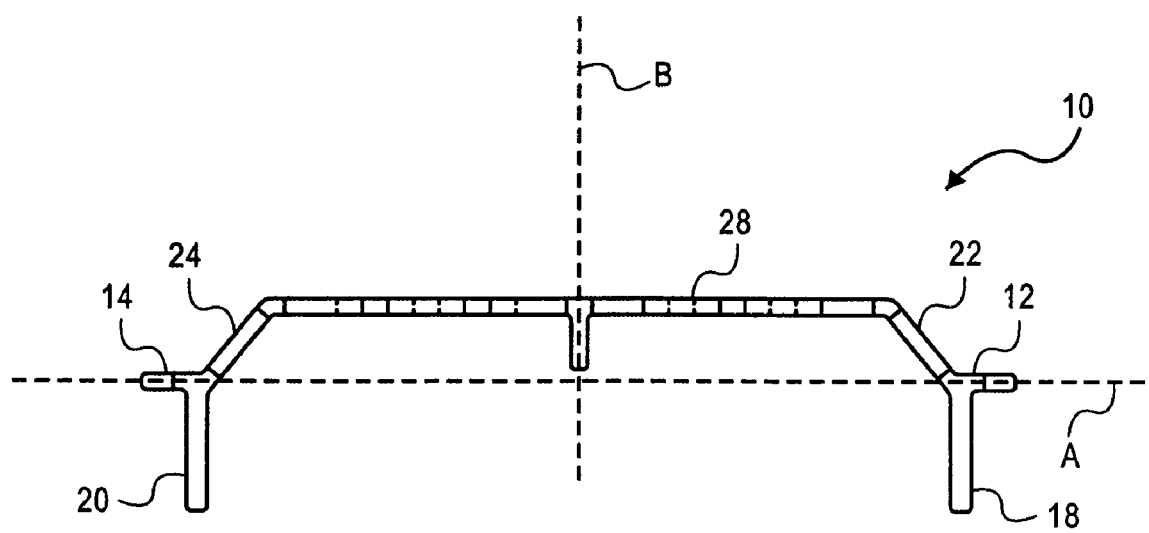
FIG. 3 is a cross-sectional end view of the heat exchange splash bar illustrated in FIG. 1, in accordance with another embodiment of the present invention.

Turning now to the drawings, and particularly FIGS. 1-3, a heat exchange splash bar, generally designated 10, is depicted in accordance with an embodiment of the present invention. The heat exchange splash bar 10 includes a first base flange wall or portion 12 that generally lies in a plane A and a second base flange wall or portion 14 that generally lies in plane A. As illustrated in the plan view of FIG. 1, each of the first and second flange walls 12, 14 have a serrated edge, generally designated 16. As illustrated in FIG. 1, the serrated edge 16 has a semi-oval geometry, however the serrated edge 16 may alternatively have varying geometries including angled serrations. Referring specifically to FIG. 3, the heat exchange bar 10 includes an extension 18, 20, that extends from each of the flange walls 12, 14, respectively. Each of the extensions 18, 20 extend from their respective flange walls 12, 14, downward, away from the flange walls 12, 14, generally parallel to the longitudinal axis B.

As depicted in FIGS. 1 and 3, the heat exchange bar 10 includes opposing first and second side walls 22, 24 that extend at an angle to the longitudinal axis B. As illustrated in detail in FIG. 3, the first side wall 22 extends upwardly away from the first flange wall 12 at an angle to the longitudinal axis B. Similarly, as also illustrated in FIG. 3, the second side wall 24 extends upwardly away from the second flange wall 14, at an angle to the longitudinal axis B in opposing relationship to the first side wall 22.

Referring now to FIG. 1, each of the side walls 22, 24 is apertured. As depicted, each of the side walls 22, 24 is perforated having a series of apertures, generally designated 26. While the apertures 26 depicted in FIG. 1 are circular in geometry, the present invention includes and provides for apertures 26 of varying shapes and geometries such as apertures having elliptical, rectangular, square and/or oval geometries.

Referring to FIGS. 1-3, the heat exchange splash bar 10 also includes a top wall or top portion 28 that extends between the first side wall 22 and the second side wall 24. The top wall 28 extends between the first and second side walls 22, 24 generally parallel to plane A. As illustrated in FIGS. 1 and 2, the top wall 28 is perforated and includes a plurality of openings or windows 30. Each of the openings 30 includes a series of finger portions 32, 34, 36 extending therein.

Referring now specifically to FIGS. 1 and 2, the top wall 28 comprises a plurality of openings 30, wherein the openings 30 have fingers 32, 34, 36 extending inwardly into the opening 30. A single opening 30 will be described in detail only as the openings 30 are similar in design and geometry. As illustrated in FIGS. 1 and 2, the opening 30 comprises a first wall, generally designated 38 and an opposing second wall generally designated 40. The first wall 38 extends between a pair of side walls 42 whereas the second wall 40 extends between a pair of protrusions 44 that each extend from the side walls 42.

Fingers 32, 34 extend from the opening 30 side wall 38 generally parallel to one another whereas finger 36 extends from side wall 40 in opposing relationship to fingers 32, 34. As illustrated in the figures, each of the fingers 32 and 34 is generally square or rectangular in shape and geometry, however the fingers 32, 34 may alternatively have circular and round geometries. As depicted in FIGS. 1 and 2, fingers 32, 34 are positioned adjacent one another and extend generally parallel to one another, away from the side wall 38, and inward into the opening 30. The fingers 32, 34 also extend generally parallel to the plane A (as illustrated in FIG. 3) and normal to the longitudinal axis B (also as illustrated in FIG. 3).

The finger 36 located and extending for the opposing side wall 40 of the opening 30, and like previously described fingers 32, 34, the finger 36 is generally square or rectangular in shape and geometry. It, however, may alternatively have circular and round geometries. Also, like the previously described fingers 32, 34, the finger 36 extends into the opening 30 from the opposing side wall 40. The finger 36 also extends generally parallel to the plane A (as illustrated in FIG. 3) and normal to the longitudinal axis B (also as illustrated in FIG. 3). As depicted in FIGS. 1 and 2, the finger 36 extends into the opening 30 at a position generally between the fingers 32 and 34.

The heat exchange splash bars illustrated in FIGS. 1-3 may be formed from any sort of material that allows for heat exchange such as plastics, metals and/or synthetic resins and may have geometries alternative from those illustrated. For example, in one embodiment of the present invention, the heat exchange bar 10 may be formed from a synthetic resin material such as polyvinylchloride. For example, in another embodiment of the present invention, the splash bar 10 may not utilize or employ the serrated base portions 12, 14 and alternatively utilize solid edge bases. Moreover, other embodiments of the present invention may not employ a total of three fingers 32, 34, 36 that extend into the openings 30. To the contrary, these embodiments may utilize a greater number of fingers or a less number.

The heat exchange bars depicted in FIGS. 1-3 and described above, may be used in mechanical draft crossflow cooling towers or the like. The towers oftentimes include an upright central plenum with a venturi-type fan stack. The fan stack typically includes a mechanically powered fan that is disposed therein. The cooling towers in which the heat exchange splash bars are typically used may include water distribution basins for receiving hot water to be cooled and distributing the same via an apertured bottom wall forming a part of each basin. Alternatively, the cooling towers may employ a water distribution system which utilizes spray nozzles to distribute the water to be cooled. The cooling towers also include a cold water collection basin which is positioned beneath the water distribution system or assembly and the plenum. The cooling tower in which the heat exchange splash bars 10 may be utilized also include a grid assembly or similar support structure, which functions to support a plurality of heat exchange splash bars, similar to embodiments described above. As previously discussed, the heat exchange splash bars serve to break up hot water distributed by the hot water distribution system or basin.

During operation of cooling towers similar to those previously described above, hot water is initially delivered to the hot water distribution system or basins. The hot water is then distributed onto the heat exchange splash bars which serve to break up the water into small droplets. Simultaneously, the fan functions to draw incoming, air currents into and through the cooling tower such that the air comes into intersecting, thermal interchange relationship with the water droplets. The air proceeds to pass through and heat exchange splash bars and then is exhausted to the atmosphere through the fan stack.

Although the heat exchange splash bars of the present invention are described for use with crossflow cooling towers, the present invention is not limited to crossflow cooling towers only. Specifically, the heat exchange splash bars described in accordance with the present invention may alternatively be utilized with counterflow towers.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A heat exchange bar for evaporative cooling, comprising:
    a first serrated base, wherein said first serrated base lies in a plane;
    a second serrated base, wherein said second serrated base lies in the plane;
    a first side wall connected to said first serrated base that extends at an angle away from said first serrated base, wherein said first side wall includes a plurality of apertures disposed thereon;
    a second side wall connected to said second serrated base that extends at an angle away from said second serrated base, wherein said second side wall includes a plurality of apertures disposed thereon; and
    a top wall that extends between said first side wall and said second side wall generally parallel to the plane, wherein said top wall includes a plurality of openings, wherein said plurality of openings each comprise a first finger that extends therein.

2. The heat exchange bar according to claim 1, further comprising:
    a first extension connected to said first serrated base, wherein said first connection extends from said first serrated base, generally normal to the plane, in a direction opposite the said first side wall.

3. The heat exchange bar according to claim 2, further comprising:
    a second extension connected to said second serrated base, wherein said second connection extends from said second serrated base, generally normal to the plane, in a direction opposite the said second side wall.

4. The heat exchange bar according to claim 1, wherein said plurality of openings further comprise a second finger that extends therein.

5. The heat exchange bar according to claim 4, wherein said plurality of openings further comprise a third finger that extends therein.

6. The heat exchange bar according to claim 5, wherein said first and second fingers extend into the openings in opposing relationship to said third finger.

7. The heat exchange bar according to claim 1, wherein the heat exchange bar is integral.

8. The heat exchange bar according to claim 7, wherein the heat exchange bar is formed of synthetic resin material.

9. The heat exchange bar according to claim 8, wherein said synthetic resin mater is polyvinylchloride.

10. A heat exchange bar for evaporative cooling that extends generally normal to a longitudinal axis, comprising:
    a first side wall that extends at an angle to the longitudinal axis, wherein said first side wall includes a plurality of apertures disposed thereon;
    a second side wall that extends at an angle to the longitudinal axis, wherein said second side wall includes a plurality of apertures disposed thereon; and
    a top wall that extends between said first side wall and said second side wall generally parallel to the plane, wherein said top wall includes a plurality of openings, said plurality of openings each comprising:
        first and second opposing side walls; and
        a first finger that extends from said first side wall.

11. The heat exchange bar in accordance with claim 10, further comprising:
    a first serrated base connected to said first side wall, wherein said first serrated base lies in a plane that extends perpendicular to the longitudinal axis; and
    a second serrated base connected to said second side wall, wherein said second serrated base lies in the plane that extends perpendicular to the longitudinal axis.

12. The heat exchange bar according to claim 11, further comprising:

a first extension connected to said first serrated base, wherein said first connection extends from said first serrated base, generally parallel to the longitudinal axis, in a direction opposite the said first side wall.

13. The heat exchange bar according to claim 12, further comprising:
a second extension connected to said second serrated base, wherein said second connection extends from said second serrated base, generally parallel to the longitudinal axis, in a direction opposite the said second side wall.

14. The heat exchange bar according to claim 11, wherein said plurality of openings further comprise a second finger that extends from said second opposing side wall.

15. The heat exchange bar according to claim 14, wherein said plurality of openings further comprise a third finger that extends from said second opposing side wall.

16. The heat exchange bar according to claim 15, wherein said first and second fingers extend into the openings in opposing relationship to said third finger.

17. The heat exchange bar according to claim 10, wherein the heat exchange bar is integral and is formed from a synthetic resin material.

18. The heat exchange bar according to claim 17, wherein said synthetic resin mater is polyvinylchloride.

19. A method for cooling a liquid utilizing a heat exchange splash bar, comprising:
passing a liquid to be cooled over the heat exchange splash bar, wherein the heat exchange splash bar comprises:
a first serrated base, wherein said first serrated base lies in a plane;
a second serrated base, wherein said second serrated base lies in the plane;
a first side wall connected to said first serrated base that extends at an angle away from said first serrated base, wherein said first side wall includes a plurality of apertures disposed thereon;
a second side wall connected to said second serrated base that extends at an angle away from said second serrated base, wherein said second side wall includes a plurality of apertures disposed thereon; and
a top wall that extends between said first side wall and said second side wall generally parallel to the plane, wherein said top wall includes a plurality of openings, wherein said plurality of openings each comprise a first finger extending therein;
contacting the liquid to be cooled to the splash bar, wherein said contacting step breaks the liquid to be cooled into liquid droplets;
drawing an air current over and through the heat exchange splash bar; and
withdrawing the heat from the liquid to be cooled.

20. A heat exchange splash bar, comprising:
means for passing a liquid to be cooled over the heat exchange splash bar, wherein the heat exchange splash bar comprises:
a first serrated base, wherein said first serrated base lies in a plane;
a second serrated base, wherein said second serrated base lies in the plane;
a first side wall connected to said first serrated base that extends at an angle away from said first serrated base, wherein said first side wall includes a plurality of apertures disposed thereon;
a second side wall connected to said second serrated base that extends at an angle away from said second serrated base, wherein said second side wall includes a plurality of apertures disposed thereon; and
a top wall that extends between said first side wall and said second side wall generally parallel to the plane, wherein said top wall includes a plurality of openings, wherein said plurality of openings each comprise a first finger extending therein;
means contacting the liquid to be cooled to the splash bar, wherein said means for contacting breaks the liquid to be cooled into liquid droplets;
means for drawing an air current over and through the heat exchange splash bar; and
means for withdrawing the heat from the liquid to be cooled.

* * * * *